United States Patent
Kuppan

(10) Patent No.: US 11,519,435 B2
(45) Date of Patent: Dec. 6, 2022

(54) VALVE FOR AIRCRAFT INFLATION SYSTEM

(71) Applicant: Goodrich Corporation, Charlotte, NC (US)

(72) Inventor: Skandan Berikai Kuppan, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 741 days.

(21) Appl. No.: 16/569,057

(22) Filed: Sep. 12, 2019

(65) Prior Publication Data

US 2021/0018023 A1 Jan. 21, 2021

(30) Foreign Application Priority Data

Jul. 16, 2019 (IN) .............................. 201911028636

(51) Int. Cl.
| | |
|---|---|
| F15D 1/02 | (2006.01) |
| B64D 25/14 | (2006.01) |
| G05D 7/01 | (2006.01) |
| F16K 7/04 | (2006.01) |
| F16K 31/00 | (2006.01) |
| F16K 1/52 | (2006.01) |

(52) U.S. Cl.
CPC .............. F15D 1/025 (2013.01); B64D 25/14 (2013.01); F16K 7/04 (2013.01); F16K 31/002 (2013.01); G05D 7/012 (2013.01); F16K 1/526 (2013.01)

(58) Field of Classification Search
CPC .......... F16K 7/04; F16K 31/002; F16K 1/526; F15D 1/025; B64D 25/14; G05D 7/012; Y10T 137/1963

USPC ................................................ 138/45; 137/79
See application file for complete search history.

(56) References Cited

U.S. PATENT DOCUMENTS

| | | | | |
|---|---|---|---|---|
| 1,265,765 | A * | 5/1918 | Ferris .................... | G05D 23/275 251/30.02 |
| 2,241,086 | A * | 5/1941 | Gould .................... | F25B 41/355 62/223 |
| 2,791,239 | A * | 5/1957 | Mason .................... | F25B 41/30 251/9 |
| 2,942,460 | A * | 6/1960 | Morgan .................. | G01M 9/04 73/147 |
| 3,017,903 | A * | 1/1962 | Steffens ................. | G05D 7/012 251/5 |
| 3,587,652 | A * | 6/1971 | Remus .................... | F16L 55/04 138/45 |
| 3,895,646 | A * | 7/1975 | Howat .................... | F16K 17/38 137/849 |

(Continued)

*Primary Examiner* — William M Mccalister
(74) *Attorney, Agent, or Firm* — Cantor Colburn LLP

(57) ABSTRACT

Disclosed is a throttle including: an upstream and downstream flanges; a flexible sheath that extends therebetween; a plurality of sets of shape memory alloy wires, extending between the flanges, that are (i) circumferentially aligned about the flanges; and (ii) exterior to the flexible sheath; and (iii) configured to contact an outer boundary of the flexible sheath, wherein: a first set of the plurality of sets of shape memory alloy wires form a first profile when exposed to a first temperature, causing the flexible sheath to form the first profile having a first internal diameter; and a second set of the plurality of sets of shape memory alloy wires form a second profile when exposed to a second temperature that is lower than the first temperature, causing the flexible sheath to form the second profile having a second internal diameter that is smaller than the first internal diameter.

20 Claims, 8 Drawing Sheets

(56) References Cited

U.S. PATENT DOCUMENTS

| | | | | |
|---|---|---|---|---|
| 4,150,558 A * | 4/1979 | Pohl | F25B 41/375 | 138/40 |
| 4,262,844 A * | 4/1981 | Sekiya | G05D 23/10 | 236/101 E |
| 4,267,853 A * | 5/1981 | Yamaguchi | F16K 17/383 | 524/496 |
| 4,419,867 A * | 12/1983 | Albagnac | F25B 41/30 | 236/93 R |
| 4,508,144 A * | 4/1985 | Bernett | G05D 7/012 | 138/45 |
| 4,665,950 A * | 5/1987 | Fruh | F16L 55/02718 | 138/40 |
| 5,011,075 A * | 4/1991 | Vandiver | G05D 23/10 | 251/117 |
| 5,031,416 A * | 7/1991 | Drucker | F25B 41/38 | 62/324.1 |
| 5,316,261 A * | 5/1994 | Stoner | G01F 1/42 | 251/129.08 |
| 5,326,468 A * | 7/1994 | Cox | B01J 19/008 | 210/764 |
| 5,345,963 A | 9/1994 | Dietiker | | |
| 6,039,030 A | 3/2000 | Robinson et al. | | |
| 6,409,147 B1 * | 6/2002 | Kenny | F16T 1/02 | 236/56 |
| 8,985,155 B2 * | 3/2015 | Loschitz | F16L 55/02754 | 138/45 |
| 9,328,695 B2 | 5/2016 | Baltas et al. | | |
| 2002/0171055 A1 * | 11/2002 | Johnson | F16K 31/566 | 251/11 |
| 2010/0224267 A1 | 9/2010 | Flomenblit et al. | | |
| 2012/0017583 A1 * | 1/2012 | Lewis | F03G 7/06 | 60/529 |
| 2013/0160445 A1 * | 6/2013 | Olson | F03G 7/065 | 60/527 |
| 2016/0305368 A1 * | 10/2016 | Hussain | F02K 1/06 | |
| 2019/0056039 A1 * | 2/2019 | Skurkis | F16K 99/0005 | |
| 2020/0281716 A1 * | 9/2020 | Zhang | F16K 7/04 | |
| 2021/0018023 A1 * | 1/2021 | Kuppan | B64D 25/14 | |

\* cited by examiner

T0 > TH1
(ΔG0 < L1)

TH2 < T1 < TH1
(L2 > ΔG1 > L1)

TH3 < T2 < TH2
(L3 > ΔG2 > L2)

TH4 < T3 < TH3
(L4 > Δ3G > L3)

TH4 < T4
(ΔG4 > L4)

VALVE FOR AIRCRAFT INFLATION SYSTEM

CROSS-REFERENCE TO RELATED APPLICATIONS

This application claims the benefit of India Patent Application No. 201911028636 filed Jul. 16, 2019, the disclosure of which is incorporated herein by reference in its entirety.

BACKGROUND

Exemplary embodiments of this disclosure relate to emergency evacuation equipment for an aircraft, and in particular to a valve for an aircraft inflation system.

A conventional method of quickly evacuating a large number of passengers from an aircraft is to provide multiple emergency exits, each of which is equipped with an inflatable evacuation slide.

Emergency evacuation slide systems may have an inflatable evacuation slide that is stored in a folded, uninflated state together with a source of inflation gas. The source of inflation gas may include a gas generator, stored compressed gas, or a combination thereof. Modern evacuation slide inflation systems may include a pressure vessel, containing the stored pressurized gas, connected to the system by an upstream high pressure flow valves and a downstream pressure regulating valve with a flow metering element therein.

BRIEF DESCRIPTION OF THE INVENTION

Disclosed is a throttle including: an upstream flange; a downstream flange; a flexible sheath that extends between the upstream flange and the downstream flange; and a plurality of sets of shape memory alloy wires, extending between the upstream flange and the downstream flange and that are circumferentially aligned about the upstream flange and the downstream flange and are exterior to the flexible sheath, the plurality of sets of shape memory alloy wires configured to contact an outer boundary of the flexible sheath, wherein: a first set of the plurality of sets of shape memory alloy wires form a first profile when exposed to a first temperature, thereby causing the flexible sheath to form the first profile, the first profile having a first internal diameter; and a second set of the plurality of sets of shape memory alloy wires form a second profile when exposed to a second temperature that is lower than the first temperature, thereby causing the flexible sheath to form the second profile, the second profile having a second internal diameter that is smaller than the first internal diameter.

In addition to one or more of the above disclosed features or as an alternate, within each of the plurality of sets of shape memory alloy wires, each wire is circumferentially spaced from each adjacent wire by an equidistant interval.

In addition to one or more of the above disclosed features or as an alternate the plurality of sets of shape memory alloy wires comprise at least four sets of shape memory alloy wires.

In addition to one or more of the above disclosed features or as an alternate the plurality of sets of shape memory alloy wires each contain at least four shape memory alloy wires.

In addition to one or more of the above disclosed features or as an alternate the first profile and the second profile of the plurality of sets of shape memory alloy wires each comprise a convergent-divergent profile.

In addition to one or more of the above disclosed features or as an alternate the flexible sheath is an elastomer.

Further disclosed is a valve comprising: an inlet port; an outlet port fluidly connected to the inlet port; a throttle having one or more of the above disclosed features, wherein the throttle is fluidly disposed between the inlet port and the outlet port; a vent port, fluidly disposed between the throttle and the inlet port; a vent plunger that is axially movable from a first position to fluidly seal the vent port and a second position to fluidly unseal the vent port, responsive to backpressure in the valve; and a biasing member that biases the vent plunger to fluidly seal the vent port.

In addition to one or more of the above disclosed features or as an alternate the biasing member is a coil spring disposed between a spring seat at the inlet port and the vent plunger, the spring seat being movable to compress and extend the biasing member.

In addition to one or more of the above disclosed features or as an alternate the valve further includes an actuator port; and an actuator plunger extending from the actuator port toward the vent plunger, the actuator plunger being axially movable between a first position where the actuator plunger is inserted into the vent plunger to close the valve, and a second position where the actuator plunger is spaced from the vent plunger to open the valve.

In addition to one or more of the above disclosed features or as an alternate the actuator plunger extends outwardly from the actuator port and is configured for being engaged by a handle to axially move the actuator plunger.

In addition to one or more of the above disclosed features or as an alternate the inlet port is disposed on a first axis and the throttle is disposed on a second axis that is oriented at an obtuse outside angle relative to the first axis.

In addition to one or more of the above disclosed features or as an alternate the actuator port is disposed on the first axis.

Further disclosed is a system for an aircraft, comprising: a gas canister and a throttle including one or more of the above disclosed features.

In addition to one or more of the above disclosed features or as an alternate the system further includes an escape slide fluidly coupled to the downstream flange of the throttle.

In addition to one or more of the above disclosed features or as an alternate the system further includes: a valve including: an inlet port; an outlet port fluidly connected to the inlet port; the throttle of claim 14 being fluidly disposed between the inlet port and the outlet port; a vent port fluidly disposed between the throttle and the inlet port; a vent plunger that is axially movable from a first position to fluidly seal the vent port and a second position to fluidly unseal the vent port, responsive to backpressure in the valve; and a biasing member that biases the vent plunger to fluidly seal the vent port.

In addition to one or more of the above disclosed features or as an alternate the valve further comprises: an actuator port; and an actuator plunger extending from the actuator port toward the vent plunger, wherein the actuator plunger is axially movable between a first position where the actuator plunger is inserted into the vent plunger to close the valve, and a second position where the actuator plunger is spaced from the vent plunger to open the valve.

In addition to one or more of the above disclosed features or as an alternate the inlet port is disposed on a first axis and the throttle is disposed on a second axis that is oriented at an obtuse outside angle relative to the first axis.

Further disclosed is a method of throttling a flow comprising: channeling the flow through a throttle formed by a flexible sheath and plurality of sets of shape memory alloy wires extending between an upstream flange and a downstream flange; forming a first profile from the plurality of sets of shape memory alloy wires exposed to a first temperature, thereby causing the flexible sheath to form the first profile, the first profile having a first internal diameter; and forming a second profile from the plurality of sets of shape memory alloy wires exposed to a second temperature that is lower than the first temperature, thereby causing the flexible sheath to form the second profile having a second internal diameter that is smaller than the first internal diameter.

In addition to one or more of the above disclosed features or as an alternate the method further includes directing flow from an inlet port to an outlet port of a valve, the throttle being fluidly disposed between the inlet port and the outlet port; venting flow through a vent port of the valve by moving a vent plunger away from the vent port responsive to flow backpressure, the vent port being between the inlet port and the throttle.

In addition to one or more of the above disclosed features or as an alternate the method further includes axially moving an actuator plunger between a first position where the actuator plunger is inserted into the vent plunger to close the valve, and a second position where the actuator plunger is spaced from the vent plunger to open the valve.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
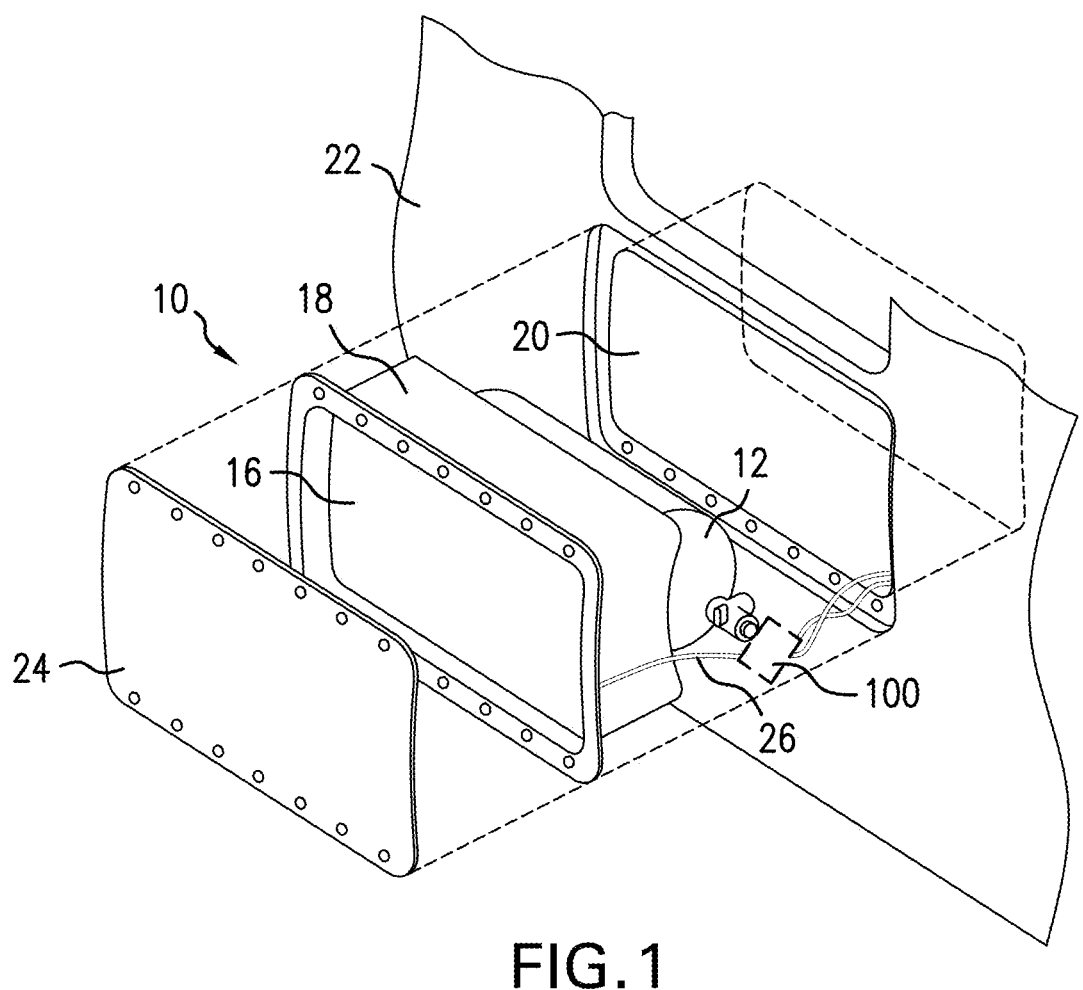
FIG. 1 is an exploded schematic diagram of inflatable aircraft evacuation slide system in an unopened state, wherein the slide system includes a valve.

With reference now to FIG. 1, an example of an inflatable aircraft evacuation slide system (system) 10 is illustrated. The system 10 includes a pressure vessel which may be a gas canister 12 containing pressurized inflation gas, a control valve (valve) 100 and an inflatable evacuation slide (slide) 16 stored in an uninflated condition within a packboard compartment 18. The packboard compartment 18 may be secured within a recess 20 in the outer hull of the aircraft 22 and covered by a cover panel 24. In normal operation, the opening of an evacuation exit door in the armed condition causes the valve 100 to open. This action allows inflation gas to flow from the gas canister 12 into the inflation line 26, thereby operating door locks and allowing the cover panel 24 to fall away, and thereby inflating the inflatable evacuation slide (slide) 16. When the system 10 is initiated at an elevated temperature, substantial excess inflation gas is produced, which is vented to the atmosphere by the valve 100.

Figure 2:
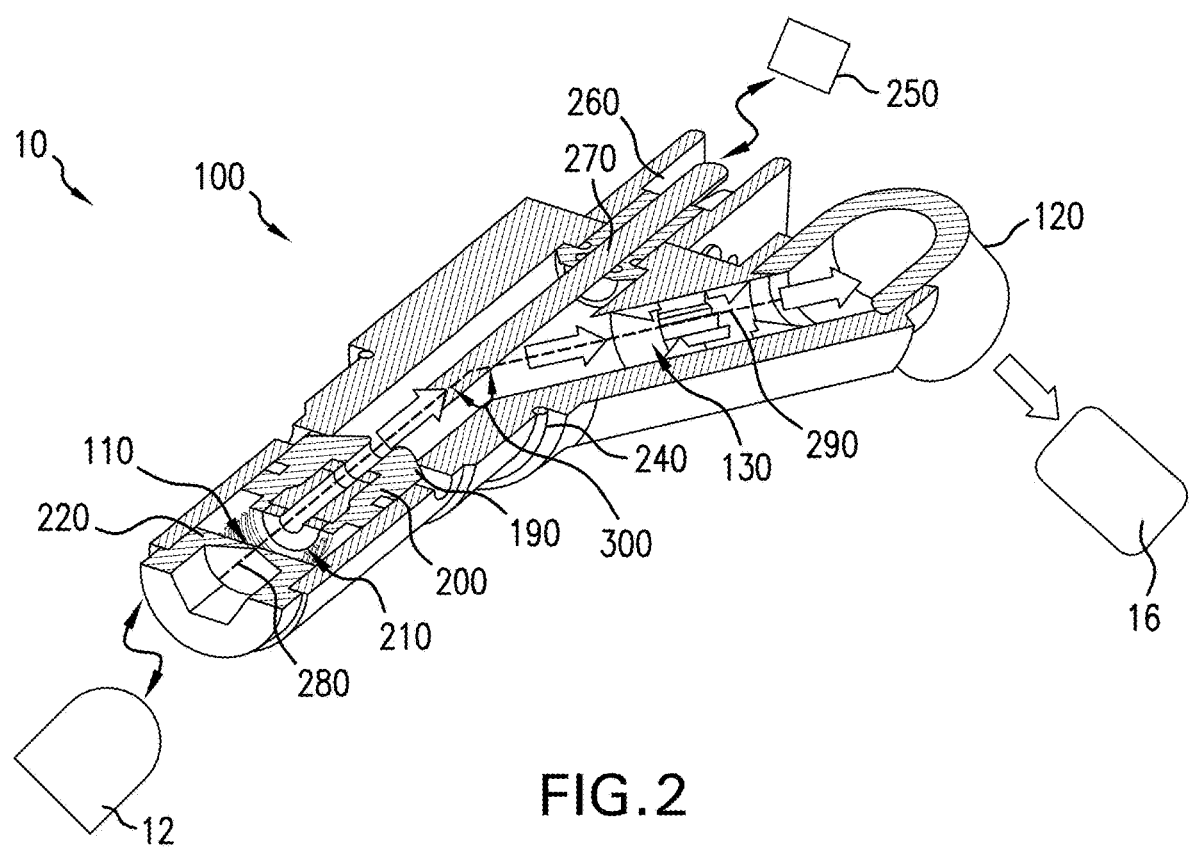
FIG. 2 is cross-sectional view of a valve FIG. 1 according to an embodiment.

FIG. 2 shows an example of a valve 100 according to one embodiment. It shall be understood that the valve 100 is illustrative only and the teachings herein can be applied to other types of valves or configurations that include a passage into which a throttle may be placed or otherwise formed.

The valve 100 can be connected to the gas canister 12. The valve 100 serves to control flow of a gas from the gas canister 12 to the slide 16. The illustrated valve 100 includes an inlet port 110 an outlet port 120 fluidly connected to the inlet port 110. The inlet port 110 is fluidly coupled to the gas canister and the outlet port 120 is fluidly coupled to the slide 16. The valve 100 includes a throttle 130 disposed between the inlet port 110 and the outlet port 120 that can vary a flow rate between the inlet port 110 and the outlet port 120.

A vent port 190 is fluidly disposed between the throttle 130 and the inlet port 110. A vent plunger 200 is axially movable from a first position to fluidly seal the vent port 190 and a second position to fluidly unseal the vent port 190, responsive to backpressure in the valve 100. A biasing member 210 biases the vent plunger 200 to fluidly seal the vent port 190. The biasing member 210 may be a coil spring disposed between a spring seat 220 at the inlet port 110 and the vent plunger 200. The spring seat 220 is movable to compress and extend the biasing member 210.

The valve 100 further includes an actuator port 260. An actuator plunger 270 extends from the actuator port 260 toward the vent plunger 200. The actuator plunger 270 is axially movable between a pluralities of positions. In a first position, the actuator plunger 270 is inserted into the vent plunger 200 to close the valve 100. In a second position, the actuator plunger 270 is spaced from the vent plunger 200 to open the valve 100. The actuator plunger 270 extends outwardly from the actuator port 260 and is configured for being engaged by a handle 250 to axially move the actuator plunger 270.

The inlet port 110 is disposed on a first axis 280 and the throttle 130 is disposed on a second axis 290. The second axis 290 is oriented at an obtuse outside angle 300 relative to the first axis 280. This configuration reduces fluid friction losses which may be observed by sharper transitions from the inlet port 110 to the outlet port 120 of the valve 100. In addition, as illustrated, the actuator port 260 is disposed on the first axis 280.

Turning now to FIGS. 3-7, an example of a throttle 130 in different operational configurations are illustrated. The throttle 130 is configured to provide an internal flow diameter that decreases with decreasing temperatures. From this, a throttling effect is provided to gas flowing therein from the gas canister 12 and toward the slide 16. (FIG. 1) As a result, as pressure decreases within the canister 12 from the depletion of gas within the gas canister 12 during use, a flow rate of gas to the slide 16 will remain inflated.

The throttle 130 includes an upstream flange 140 and a downstream flange 150 connected to the upstream flange 140. A flexible sheath 160 extends between the upstream flange 140 and the downstream flange 150. The flexible sheath 160 may be formed of an elastomer. A plurality of sets of shape memory alloy wires (SMA wires) 170 extend between the upstream and downstream flanges 140, 150. The SMA wires 170 can be arranged circumferentially aligned about one or both the upstream flange 140 and the downstream flange 150 and are exterior to the flexible sheath 160 to contact an outer boundary 175 of the flexible sheath 160. The SMA wires 170 may form a profile thereby forming the same profile along the outer boundary of the flexible sheath 160. A shape-memory alloy (SMA) is an alloy that can be deformed when cold but returns to its pre-deformed ("remembered") shape when heated. It may also be called memory metal, memory alloy, smart metal, smart alloy, or muscle wire. In the disclosed embodiments, the SMA wires 270, as combined and when exposed to successively decreasing temperatures, form converging-diverging profiles with successively decreasing necks. These profiles cause the flexible sheath 160 to form the same converging-diverging profiles with successively decreasing throats.

Figure 3A:
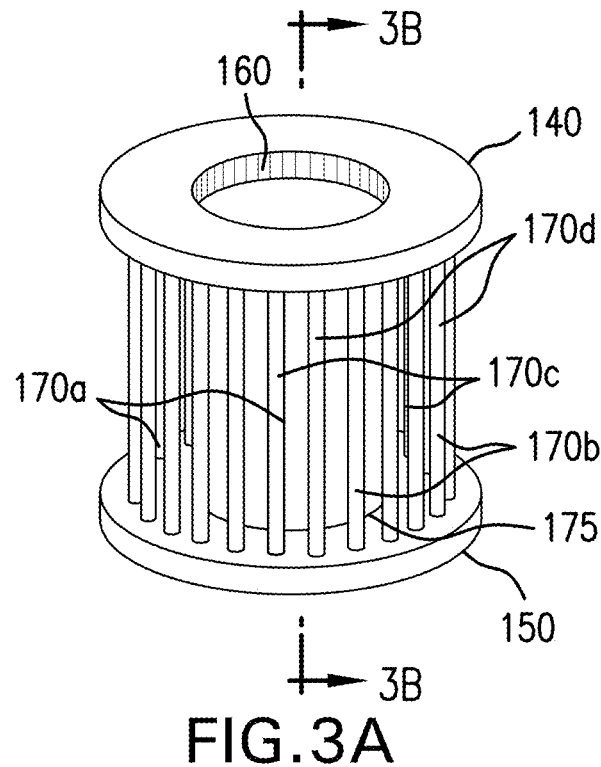
FIGS. 3A-3B, respectively, illustrate a throttle and a cross section of the throttle of the valve of FIG. 2, according to an embodiment, and wherein the cross section is cut along line A-A in FIG. 3A.
Figure 3B:
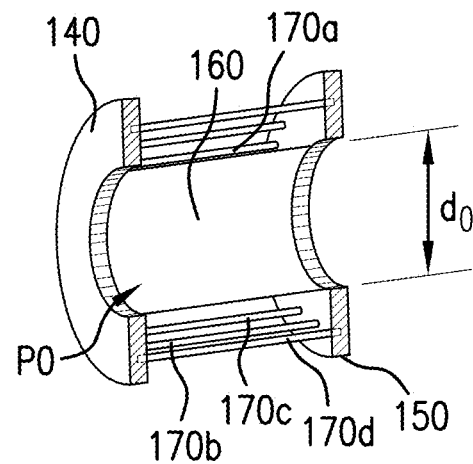

As illustrated in FIGS. 3A-3B, the plurality of sets of SMA wires 170 form an unmodified profile P0. This profile P0 is obtained when the throttle 130 is exposed to initial temperatures T0 that are above a first threshold TH1, that is, T0>TH1, for causing a reaction from any of the plurality of sets of SMA wires 170. This occurs, for example, when the gas canister 12 is first opened while filed with gas and an initial change (delta) in gas $\Delta G0$ in the canister 12 is less than a first incremental loss L1, or $\Delta G0<L1$. The unmodified profile has an unmodified internal diameter D0.

Figure 4A:
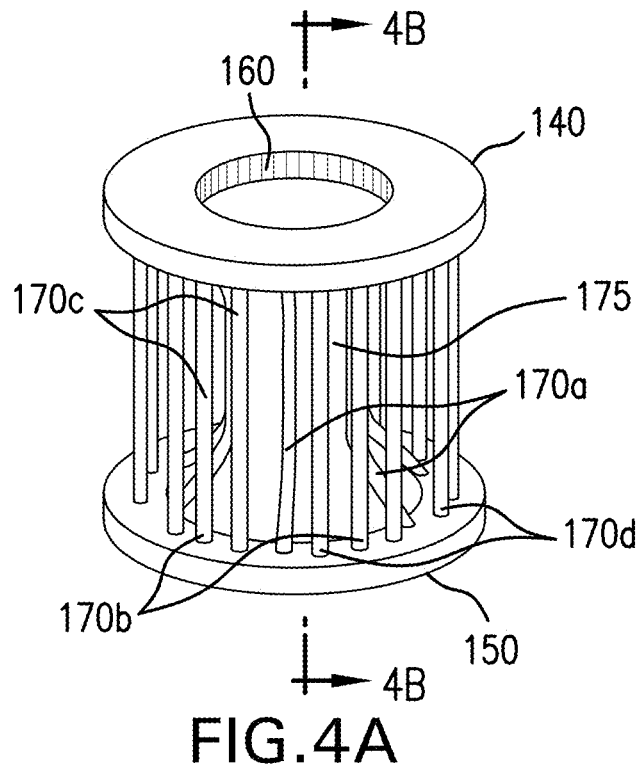
FIGS. 4A-4B, respectively, illustrate the throttle and the cross section of the throttle of the valve of FIG. 2, wherein the throttle is in a first narrowed state according to an embodiment, and wherein the cross section is cut along line B-B in FIG. 4A.
Figure 4B:
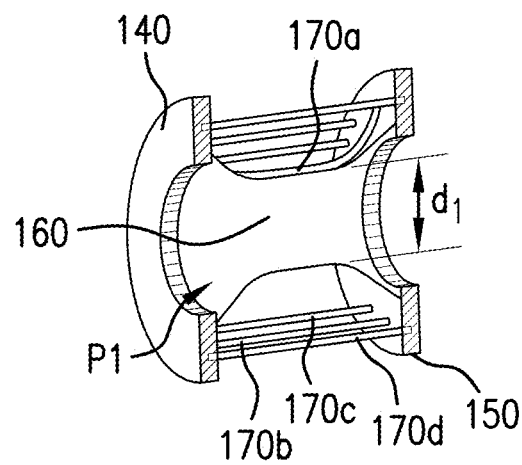

As illustrated in FIGS. 4A-4B, a first set 170a of the plurality of sets of SMA wires 170 forms a first convergent-divergent profile P1 when exposed to a first temperature T1 that is lower than the first threshold TH1, that is, T1<TH1. Such temperature change occurs as gas begins to deplete from the gas canister 12 during use such that a first change (delta) in gas $\Delta G1$ in the canister 12 is greater than a first incremental loss L1 and less than a second incremental loss L2, or $L2>\Delta G1>L1$. The first profile P1 of the first set 170a of the SMA wires causes the flexible sheath 160 to deform from the unmodified profile to the first profile P1 due to contact with the first set 170a of SMA wires. The first profile P1 has a first internal diameter D1 that is smaller than D0. The first set 170a of the SMA wires 170 maintain the first profile P1 so long as the first temperature T1 of the flow through the throttle 130 is below the first threshold TH1 and above a second temperature threshold TH2, or TH2<T1<TH1. Due to the decreased first internal diameter D1 relative to the unmodified internal diameter D0, pressure of the flow through the throttle 130 will increase. This will result in a steady flow of gas exiting the gas canister 12 as gas in the gas canister 12 is partially depleted from the first incremental loss L1 of gas.

Figure 5A:
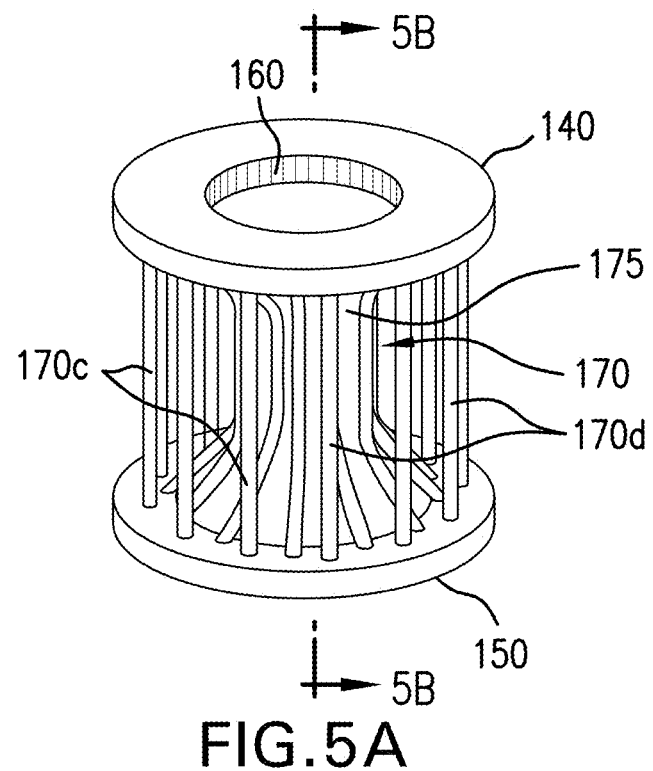
FIGS. 5A-5B, respectively, illustrate the throttle and the cross section of the throttle of the valve of FIG. 2, wherein the throttle is in a second throttled state according to an embodiment, and wherein the cross section is cut along line C-C in FIG. 5A.
Figure 5B:
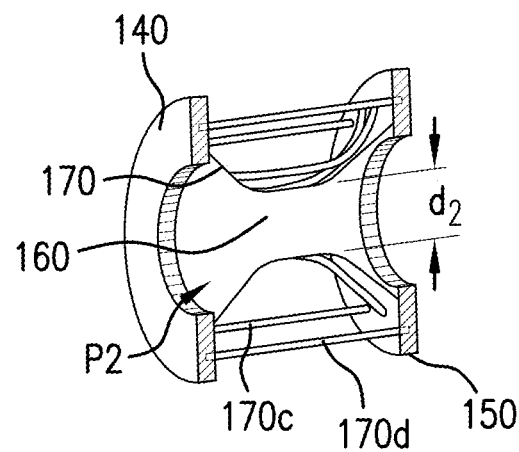

As illustrated in FIGS. 5A-5B, a second set 170b of the plurality of sets of SMA wires 170 forms a second convergent-divergent profile P2 when exposed to a second temperature T2 which is lower than a the second threshold temperature TH2. Such temperature change occurs as gas continues to deplete from the gas canister 12 during use such that a second change (delta) in gas $\Delta G2$ in the canister 12 is greater than a second incremental loss L2 and less than a third incremental loss L3, or $L3>\Delta G2>L2$. From this, the flexible sheath 160 also deforms to the second profile P2 due to contact with the second set 170b. The second profile P2 has a second internal diameter D2 that is smaller than the first internal diameter D1. The second set 170b of the SMA wires 170 maintain the second profile P2 so long as the second temperature T2 of the flow through the throttle 130 is below the second threshold TH2 and above a third temperature threshold TH3, or TH3<T2<TH2. Due to the decreased second internal diameter D2 relative to the first internal diameter D1, pressure of the flow through the throttle 130 will increase. As indicated, this will result in a steady flow of gas exiting the gas canister 12 as gas in the gas canister 12 is further partially depleted from the second incremental loss L2 of gas.

Figure 6A:
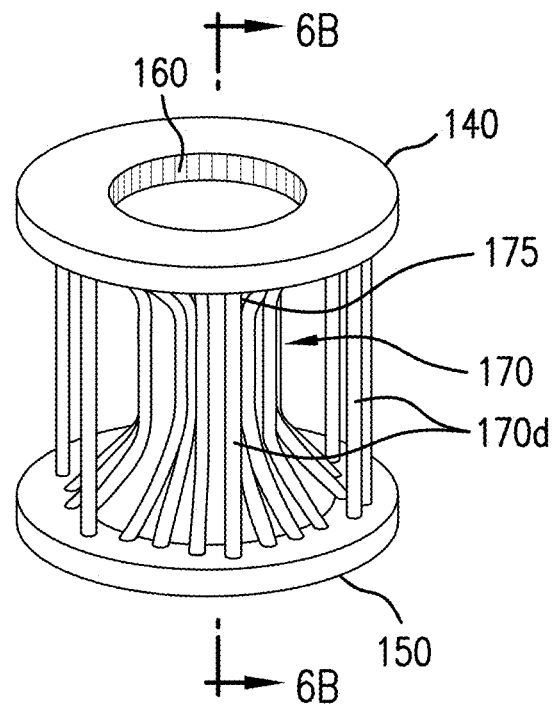
FIGS. 6A-6B, respectively, illustrate the throttle and the cross section of the throttle of the valve of FIG. 2, wherein the throttle is in a third throttled state according to an embodiment, and wherein the cross section is cut along line D-D in FIG. 6A.
Figure 6B:
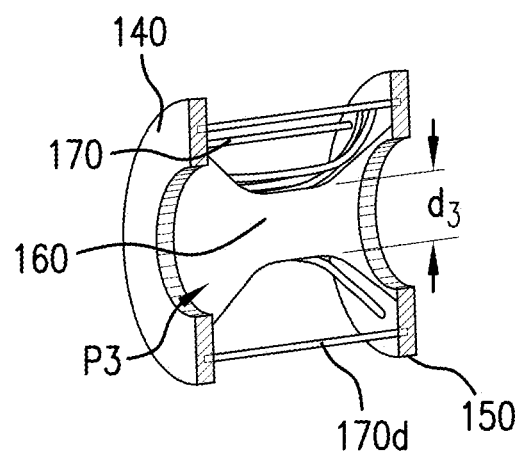

As illustrated in FIGS. 6A-6B, a third set 170c of the plurality of sets of SMA wires 170 forms a third convergent-divergent profile P3 when exposed to a third temperature T3 that is lower than the third threshold temperature TH3. Such temperature change occurs as gas further depletes from the gas canister 12 during use such that a third change (delta) in gas $\Delta G3$ in the canister 12 is greater than a third incremental loss L3 and less than a fourth incremental loss L4, or $L4>\Delta G3>L3$. From this, the flexible sheath 160 also deforms to the third profile P3 due to contact with the third set 170c. The third profile P3 has a third internal diameter D3 that is smaller than the second internal diameter D2. The third set 170c of the SMA wires maintain the third profile P3 so long as the third temperature of the flow through the throttle 130 is below the third threshold TH3 and above a fourth temperature threshold TH4. Due to the decreased third internal diameter D3 relative to the second internal diameter D2, pressure of the flow through the throttle 130 will increase. As indicated, this will result in a steady flow of gas exiting the gas canister as gas in the gas canister 12 is further partially depleted from the second incremental loss L2 of gas.

Figure 7A:
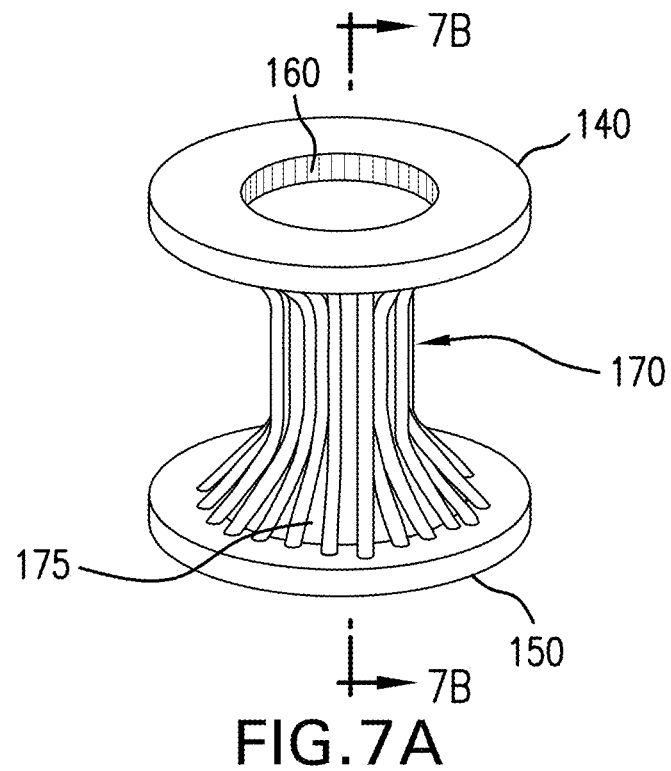
FIGS. 7A-7B, respectively, illustrate the throttle and the cross section of the throttle of a valve of FIG. 2, wherein the throttle is in a fourth throttled state according to an embodiment, and wherein the cross section is cut along line E-E in FIG. 7A.
Figure 7B:
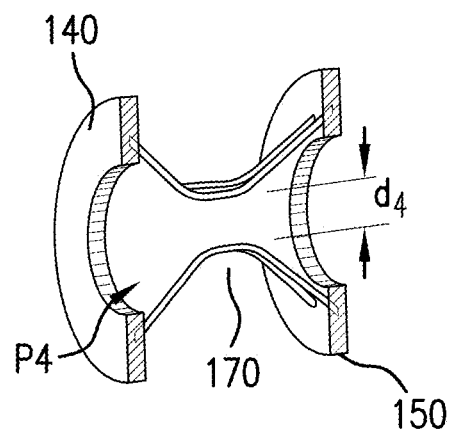

As illustrated in FIGS. 7A-7B, a fourth set 170d of the plurality of sets of SMA wires 170 forms a fourth convergent-divergent profile P4 when exposed to a fourth temperature T4 that is lower than the fourth threshold TH4. Such temperature change occurs as the gas canister 12 becomes substantially depleted during use such that a fourth incremental loss (delta) L4 of gas $\Delta G4$ occurs in the gas canister 12, or $\Delta G4>L4$. From this, the flexible sheath 160 also deforms to the fourth profile P4 due to contact with the fourth set 170d. The fourth profile P4 has a fourth internal diameter D4 that is smaller than the third internal diameter D3. The fourth set 170d of the SMA wires 170 maintain the fourth profile P4 so long as the temperature T4 of the flow through the throttle 130 is below the fourth threshold TH4, or T4<TH4. As indicated, this will result in a steady flow of gas exiting the gas canister 12 as gas in the gas canister 12 is further depleted from the fourth incremental loss L4 of gas.

It is to be appreciated that although four sets of SMA wires 170 are illustrated, a fewer or greater number of sets may be utilized to achieve desired results, depending on the configuration. Within each of the plurality of sets of SMA wires 170, there may be at least four wires. In addition, within each of the plurality of sets of SMA wires 170, each wire may be circumferentially spaced from each adjacent wire by an equidistant interval. Having at least four wires, spaced as indicated for each set of SMA wires 170, may enable a uniform convergent-divergent profile for the flexible sheath 160 when acted upon the by sets of SMA wires 170.

Figure 8:
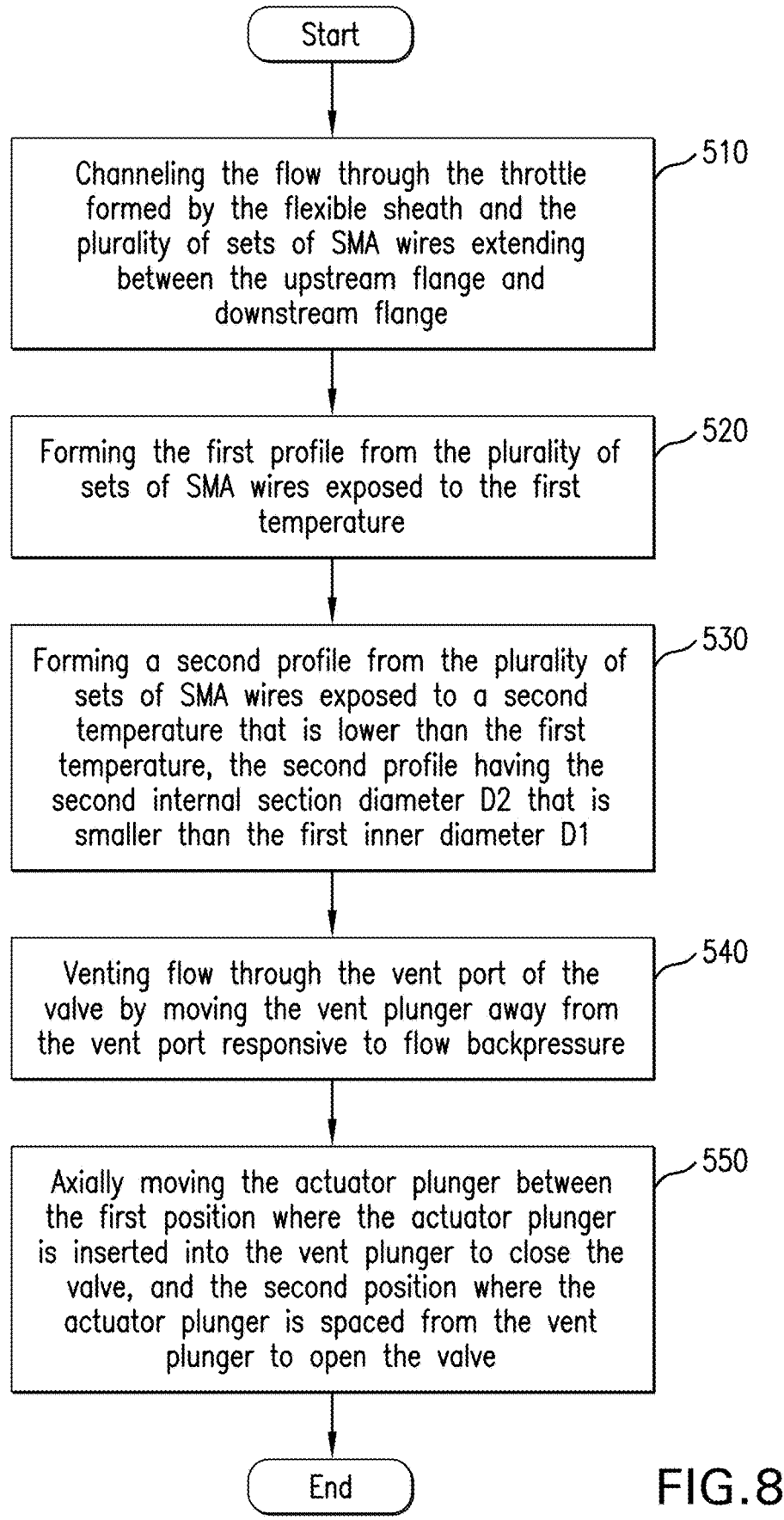
FIG. 8 is block diagram showing a method for throttling gas through the valve of FIG. 1 according to an embodiment.

As illustrated in FIG. 8, a method is disclosed of throttling a flow. As shown in block 510, the method includes channeling the flow through the throttle 130 by the flexible sheath and the plurality of sets of SMA wires 170 extending between the upstream flange 140 and downstream flange 150. As shown in block 520 the method includes forming the first profile from the plurality of sets of SMA wires 170 exposed to the first temperature resulting from incrementally depleting gas in the gas canister 12. This causes the flexible sheath 160 to form the first profile having the first internal diameter D1. As shown in block 530 the method includes forming a second profile from the plurality of sets of SMA wires 170 exposed to a second temperature that is lower than the first temperature resulting from further incrementally depleting gas in the gas canister 12. This causes the flexible sheath 160 to form the second profile having the second internal diameter D2 that is smaller than the first internal diameter D1. As indicated, above, exposing the plurality of sets of SMA wires 170 to successively lower temperatures causes the flexible sheath 160 to form successive profiles having successively smaller internal diameters as a result of further incrementally depleting gas in the gas canister 12.

As shown in block 540 the method may further include venting flow through the vent port 190 of the valve 100 by moving the vent plunger 200 away from the vent port 190 responsive to flow backpressure. As illustrated in block 550 the method includes axially moving the actuator plunger 270 between a plurality of positions. The plurality of positions, as indicated, include the first position where the actuator plunger 270 is inserted into the vent plunger 200 to close the valve 100, and the second position where the actuator plunger 270 is spaced from the vent plunger 200 to open the valve 100.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A throttle comprising:
   an upstream flange;
   a downstream flange;
   a flexible sheath that extends between the upstream flange and the downstream flange; and
   a plurality of sets of shape memory alloy wires, extending between the upstream flange and the downstream flange and that are circumferentially aligned about the upstream flange and the downstream flange and are exterior to the flexible sheath, the plurality of sets of shape memory alloy wires configured to contact an outer boundary of the flexible sheath,
   wherein:
      a first set of the plurality of sets of shape memory alloy wires form a first profile when exposed to a first temperature, thereby causing the flexible sheath to form the first profile, the first profile having a first internal diameter; and
      a second set of the plurality of sets of shape memory alloy wires form a second profile when exposed to a second temperature that is lower than the first temperature, thereby causing the flexible sheath to form the second profile, the second profile having a second internal diameter that is smaller than the first internal diameter.

2. The throttle of claim 1, wherein, within each of the plurality of sets of shape memory alloy wires, each wire is circumferentially spaced from each adjacent wire by an equidistant interval.

3. The throttle of claim 2, wherein the plurality of sets of shape memory alloy wires comprise at least four sets of shape memory alloy wires.

4. The throttle of claim 3, wherein the plurality of sets of shape memory alloy wires each contain at least four shape memory alloy wires.

5. The throttle of claim 4, wherein the first profile and the second profile of the plurality of sets of shape memory alloy wires each comprise a convergent-divergent profile.

6. The throttle of claim 5, wherein the flexible sheath is an elastomer.

7. A valve comprising:
   an inlet port;
   an outlet port fluidly connected to the inlet port;
   the throttle of claim 5, wherein the throttle is fluidly disposed between the inlet port and the outlet port;
   a vent port, fluidly disposed between the throttle and the inlet port;
   a vent plunger that is axially movable from a first position to fluidly seal the vent port and a second position to fluidly unseal the vent port, responsive to backpressure in the valve; and
   a biasing member that biases the vent plunger to fluidly seal the vent port.

8. The valve of claim 7, wherein the biasing member is a coil spring disposed between a spring seat at the inlet port and the vent plunger, the spring seat being movable to compress and extend the biasing member.

9. The valve of claim 8, further comprising:
   an actuator port; and
   an actuator plunger extending from the actuator port toward the vent plunger,
   the actuator plunger being axially movable between a first position where the actuator plunger is inserted into the vent plunger to close the valve, and a second position where the actuator plunger is spaced from the vent plunger to open the valve.

10. The valve of claim 9, wherein the actuator plunger extends outwardly from the actuator port and is configured for being engaged by a handle to axially move the actuator plunger.

11. The valve of claim 10, wherein the inlet port is disposed on a first axis and the throttle is disposed on a second axis that is oriented at an obtuse outside angle relative to the first axis.

12. The valve of claim 11, wherein the actuator port is disposed on the first axis.

13. A system for an aircraft, comprising:
a gas canister;
a throttle including:
   an upstream flange fluidly coupled to the gas canister;
   a downstream flange;
   flexible sheath that extends between the upstream flange and the downstream flange; and
a plurality of sets of shape memory alloy wires, extending between the upstream flange and the downstream flange and that are circumferentially aligned about the upstream flange and the downstream flange and are exterior to the flexible sheath, the plurality of sets of shape memory alloy wires configured to contact an outer boundary of the flexible sheath,
wherein:
   a first set of the plurality of sets of shape memory alloy wires form a first profile when exposed to a first temperature, thereby causing the flexible sheath to form the first profile, the first profile having a first internal diameter, and
   a second set of the plurality of sets of shape memory alloy wires form a second profile when exposed to a second temperature that is lower than the first temperature, thereby causing the flexible sheath to form the second profile, the second profile having a second internal diameter that is smaller than the first diameter.

14. The system of claim 13, further comprising an escape slide fluidly coupled to the downstream flange of the throttle.

15. The system of claim 14, further comprising:
a valve including:
   an inlet port;
   an outlet port fluidly connected to the inlet port;
   the throttle of claim 14 being fluidly disposed between the inlet port and the outlet port;
   a vent port fluidly disposed between the throttle and the inlet port;
   a vent plunger that is axially movable from a first position to fluidly seal the vent port and a second position to fluidly unseal the vent port, responsive to backpressure in the valve; and
   a biasing member that biases the vent plunger to fluidly seal the vent port.

16. The system of claim 15, wherein the valve further comprises:
   an actuator port; and
   an actuator plunger extending from the actuator port toward the vent plunger,
   wherein the actuator plunger is axially movable between a first position where the actuator plunger is inserted into the vent plunger to close the valve, and a second position where the actuator plunger is spaced from the vent plunger to open the valve.

17. The system of claim 16, wherein the inlet port is disposed on a first axis and the throttle is disposed on a second axis that is oriented at an obtuse outside angle relative to the first axis.

18. A method of throttling a flow comprising:
channeling the flow through a throttle formed by a flexible sheath and plurality of sets of shape memory alloy wires extending between an upstream flange and a downstream flange;
forming a first profile from the plurality of sets of shape memory alloy wires exposed to a first temperature, thereby causing the flexible sheath to form the first profile, the first profile having a first internal diameter; and
forming a second profile from the plurality of sets of shape memory alloy wires exposed to a second temperature that is lower than the first temperature, thereby causing the flexible sheath to form the second profile having a second internal diameter that is smaller than the first internal diameter.

19. The method of claim 18, further comprising:
directing flow from an inlet port to an outlet port of a valve, the throttle being fluidly disposed between the inlet port and the outlet port; and
venting flow through a vent port of the valve by moving a vent plunger away from the vent port responsive to flow backpressure, the vent port being between the inlet port and the throttle.

20. The method of claim 19, further comprising axially moving an actuator plunger between a first position where the actuator plunger is inserted into the vent plunger to close the valve, and a second position where the actuator plunger is spaced from the vent plunger to open the valve.

* * * * *